United States Patent
Fukui et al.

(10) Patent No.: US 9,623,791 B2
(45) Date of Patent: Apr. 18, 2017

(54) LIGHTING DEVICE, VEHICLE ILLUMINATION DEVICE, AND VEHICLE

(71) Applicant: Panasonic Intellectual Property Management Co., Ltd., Osaka (JP)

(72) Inventors: Takahiro Fukui, Osaka (JP); Masaaki Takamatsu, Nara (JP); Kazuya Kato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/204,538

(22) Filed: Jul. 7, 2016

(65) Prior Publication Data

US 2017/0008447 A1    Jan. 12, 2017

(30) Foreign Application Priority Data

Jul. 9, 2015    (JP) .................................. 2015-137798

(51) Int. Cl.
*H05B 37/02*    (2006.01)
*B60Q 1/14*    (2006.01)
(Continued)

(52) U.S. Cl.
CPC ......... *B60Q 1/1407* (2013.01); *B60Q 1/1446* (2013.01); *F21S 48/1225* (2013.01);
(Continued)

(58) Field of Classification Search
CPC  B60Q 1/1407; B60Q 1/1446; H05B 33/0845; H05B 33/0815; H05B 33/083; F21S 48/1225; F21S 48/13
See application file for complete search history.

(56) References Cited

U.S. PATENT DOCUMENTS

2006/0170370 A1*  8/2006  De Anna ............ H05B 33/0848
                                                    315/185 S
2007/0205728 A1*  9/2007  Suzuki ............... H05B 37/0263
                                                    315/291
(Continued)

FOREIGN PATENT DOCUMENTS

EP    2 364 064 A2    9/2011
EP    2 675 246 A2    12/2013
(Continued)

*Primary Examiner* — Don Le
(74) *Attorney, Agent, or Firm* — Renner, Otto, Boisselle & Sklar, LLP

(57) ABSTRACT

The lighting device includes a control circuit performing dimming control of dimming a light source device according to a desired dimming level. In the dimming control, the control circuit sets a desired current value of amplitude control to a value corresponding to the desired dimming level, and set a desired duty cycle of pulse width modulation control to a predetermined value associated with a dimming subrange containing the desired dimming level, of multiple different dimming subranges of a total dimming range of the light source device. The predetermined value is a duty cycle allowing luminance of the light source device to be equal to upper limit luminance of the associated dimming subrange under a condition where the current value of the current of the light source device is a maximum value.

7 Claims, 11 Drawing Sheets

(51) Int. Cl.
      *H05B 33/08*       (2006.01)
      *F21S 8/10*         (2006.01)
      *F21Y 115/10*     (2016.01)

(52) U.S. Cl.
      CPC ............ *F21S 48/13* (2013.01); *H05B 33/083* (2013.01); *H05B 33/0815* (2013.01); *H05B 33/0845* (2013.01); *F21Y 2115/10* (2016.08)

(56) References Cited

U.S. PATENT DOCUMENTS

| | | | |
|---|---|---|---|
| 2010/0219764 A1 | 9/2010 | Yamasaki et al. | |
| 2015/0312982 A1* | 10/2015 | Melanson | H05B 33/0815 |
| | | | 315/287 |
| 2016/0360589 A1* | 12/2016 | Neudorf | H05B 33/0815 |

FOREIGN PATENT DOCUMENTS

| | | |
|---|---|---|
| JP | 2005-267999 A | 9/2005 |
| JP | 2011-108669 A | 6/2011 |
| JP | 2011-181454 A | 9/2011 |
| JP | 2011-258515 A | 12/2011 |
| JP | 2013-258003 A | 12/2013 |

* cited by examiner

LIGHTING DEVICE, VEHICLE ILLUMINATION DEVICE, AND VEHICLE

CROSS-REFERENCE TO RELATED APPLICATION

The present application is based upon and claims the benefit of a priority of Japanese Patent Application No. 2015-137798, filed on Jul. 9, 2015, the entire contents of which are incorporated herein by reference.

TECHNICAL FIELD

The present disclosure generally relates to lighting devices, vehicle illumination devices, and vehicles, and in particular to a lighting device, a vehicle illumination device, and a vehicle which are capable of dimming a light source.

BACKGROUND ART

In the past, there has been proposed an LED lighting device capable of dimming a light emitting diode (LED) light emitting unit (as disclosed in Document 1 (JP 2011-181454 A), for example).

The LED lighting device disclosed in Document 1 includes a constant current output unit and a pulse width modulation (PWM) current output unit. The constant current output unit supplies a first LED current with a constant amplitude to the LED light emitting unit. The PWM current output unit supplies a second LED current with a predetermined duty cycle to the LED light emitting unit. This LED lighting device supplies a current equal to the sum of the first LED current and the second LED current to the LED light emitting unit. When a given dimming level is equal to or higher than a first dimming level, in order to dim the LED light emitting unit, the duty cycle of the second LED current is fixed to a predetermined value, and the amplitude of the first LED current is adjusted according to the given dimming level. When a given dimming level is equal to or lower than a second dimming level lower than the first dimming level, in order to dim the LED light emitting unit, the amplitude of the first LED current is fixed to predetermined amplitude and the duty cycle of the second LED current is adjusted according to the given dimming level.

In the LED lighting device disclosed in Document 1, while the given dimming level is equal to or lower than the second dimming level, the PWM current output unit adjusts the duty cycle of the second LED current according to the given dimming level to thereby dim the LED light emitting unit. Therefore, when the dimming level is changed to decrease luminance, the duty cycle is decreased according to the dimming level, and accordingly, an on-period of the second LED current is shortened. When the on-period of the second LED current is shortened, effects caused by the slew rate will increase, and this may lead to an increase in difficulty of producing a desired LED current, and additionally a decrease in controllability of the dimming control.

SUMMARY

An objective of the present disclosure would be to propose a lighting device, a vehicle illumination device, and a vehicle which are capable of improving controllability of dimming control.

The lighting device of one aspect according to the present disclosure includes: a lighting circuit configured to supply a current to a light source device; and a control circuit configured to perform dimming control of the lighting circuit according to a desired dimming level to thereby dim the light source device. The dimming control includes amplitude control and pulse width modulation control. The amplitude control is control of adjusting a current value of the current to a desired current value. The pulse width modulation control is control of adjusting a duty cycle to a desired duty cycle. The duty cycle is defined as a ratio of an on-period to a cycle being a sum of the on-period and an off-period. The on-period is a period in which the current flows through the light source device. The off-period is a period in which the current does not flow through the light source device. A total dimming range of the light source device includes multiple different dimming subranges which are different ranges of dimming levels and associated with different predetermined values each of which is defined as the duty cycle which allows luminance of the light source device to be equal to preliminarily determined upper limit luminance of an associated one of the multiple different dimming subranges under a condition where the current value of the current is a maximum value. The control circuit is configured to, in the dimming control, set the desired current value to a value corresponding to the desired dimming level, and further set the desired duty cycle to one of the different predetermined values associated with one of the multiple dimming subranges which contains the desired dimming level.

The vehicle illumination device of one aspect according to the present disclosure includes: a light source device; the lighting device of the above aspect for controlling the light source device; and a body which is to be attached to a vehicle and is for holding the light source device and the lighting device.

The vehicle illumination device of another aspect according to the present disclosure includes: a pair of light source devices; a pair of lighting devices of any one of the first to fourth aspects for controlling the pair of light source devices individually; and a pair of bodies which are to be attached to a left and right sides of a vehicle and are for holding the pair of light source devices and the pair of lighting devices individually.

The vehicle of one aspect according to the present disclosure includes: at least one of the vehicle illumination devices of the aspects; and a vehicle body to which the vehicle illumination device is attached.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION

Hereinafter, the lighting devices of the present embodiments are described with reference to the drawings. The lighting devices of the present embodiments can be used for operating light sources (e.g., headlights) mounted to vehicles (e.g., automobiles and motorcycles). However, the following embodiments are some of embodiments according to the present disclosure. The scope of the present disclosure is not limited to the following embodiments, and also the embodiments can be modified according to design or the like without departing from the scope of the present disclosure.

1. Embodiment 1

Figure 1:
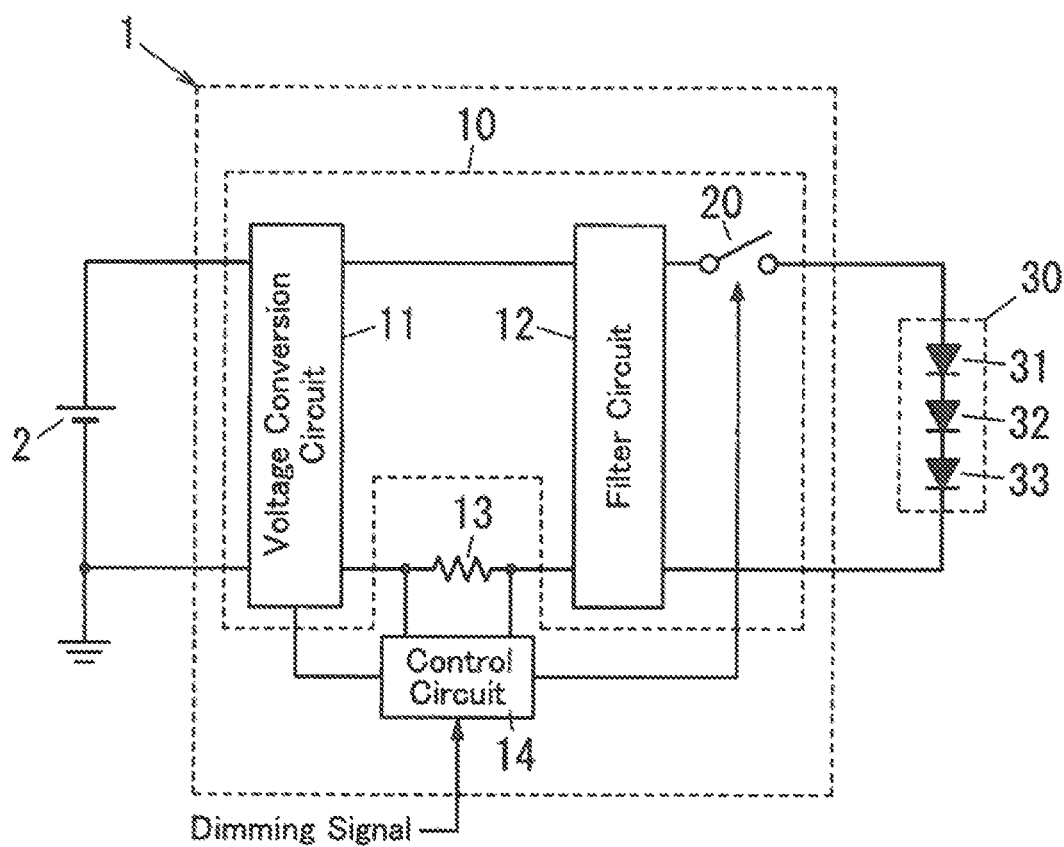
FIG. 1 is circuit diagram of a lighting device of Embodiment 1.

FIG. 1 is a circuit diagram of a lighting device 1 of the present embodiment. The lighting device 1 includes a lighting circuit 10 and a control circuit 14, and is configured to operate (light) a light source device 30.

The light source device 30 includes three light source groups 31, 32, and 33. The light source groups 31, 32, and 33 each include multiple light emitting diodes connected in series and/or parallel. Note that, each of the light source groups 31, 32, and 33 is not limited to including multiple light emitting diodes. Each of the light source groups 31, 32, and 33 may include a single light emitting diode.

The lighting circuit 10 is configured to supply a current to the light source device 30. For example, the lighting circuit 10 includes a voltage conversion circuit 11, a filter circuit 12, and a switch 20.

The voltage conversion circuit 11 is, for example, a switching power supply circuit such as a step-up chopper circuit. The voltage conversion circuit 11 performs switching control according to a control signal (first control signal) inputted from the control circuit 14 to convert a DC voltage supplied from the DC power supply 2 such as a vehicle battery, into an output voltage having a voltage value according to the control signal. Note that, the voltage conversion circuit 11 is not limited to a step-up chopper circuit, but may be a DC-DC converter such as a step-down chopper circuit and a step-up and down chopper circuit.

The filter circuit 12 is configured to cause a loss of a high frequency component contained in the output voltage of the voltage conversion circuit 11, thereby suppressing the high frequency component contained in the output voltage of the voltage conversion circuit 11.

The switch 20 and the light source groups 31, 32, and 33 are connected in series between output terminals of the filter circuit 12. The switch 20 may be a semiconductor switch such as a metal oxide semiconductor field effect transistor (MOSFET), for example. The switch 20 is to be turned on and off according to a control signal (second control signal) inputted from the control circuit 14 to a control electrode of the switch 20. Note that, the switch 20 is not limited to a MOSFET, but may be a bipolar transistor such as an insulated gate bipolar transistor (IGBT).

The control circuit 14 is configured to dim the light source device 30 (the light source groups 31, 32, and 33) according to a dimming signal inputted from an external circuit (e.g., an engine control unit (ECU) mounted on a vehicle), for example. In more detail, to dim the light source device 30, the control circuit 14 performs control defined as a combination of amplitude control and pulse width modulation (PWM) control based on a dimming level (the desired dimming level) indicated by the dimming signal. Note that, the control circuit 14 performs the PWM control on the light source device 30, and this may lead to a period in which the light source device 30 is off. However, a cycle of the PWM control is set not to allow persons to visually perceive that the light source device 30 is off. Hence, there is no practical problem to use the present embodiment as the illumination device.

The control circuit 14 is configured to measure a voltage across a resistor 13 connected in series with the light source device 30 (the light source groups 31, 32, and 33), and determine a current value (amplitude) of a current flowing through the light source device 30, based on the voltage across the resistor 13. The control circuit 14 is configured to output the first control signal to the voltage conversion circuit 11 based on a result of measurement of the current value of the current flowing through the light source device 30 in order to cause the voltage conversion circuit 11 to perform switching operation, thereby changing the output voltage of the voltage conversion circuit 11. In summary, the control circuit 14 adjusts the output voltage of the voltage conversion circuit 11 to thereby control the current value of the current supplied from the lighting circuit 10 to the light source device 30 (the amplitude control).

The control circuit 14 outputs the second control signal to the switch 20 in order to turn on and off the switch 20. The control circuit 14 controls lengths of a period in which the switch 20 is on and a period in which the switch 20 is off, thereby controlling a duty cycle (the PWM control). The duty cycle is a ratio of an on-period to a cycle. The cycle is the sum of the on-period and an off-period. The on-period is a period in which the current flows through the light source device 30, and the off-period is a period in which the current does not flow the light source device 30.

The control circuit 14 performs dimming control described later with regard to each of multiple dimming subranges divided from a total dimming range of the light source device 30. With regard to each of the multiple dimming subranges, the control circuit 14 performs the PWM control at the fixed duty cycle which allows luminance of the light source device 30 to be equal to upper limit luminance of the dimming subrange while the current value of the current is a maximum value. This means that in each of the multiple dimming subranges, the duty cycle of the PWM control is constant. Further, with regard to each of the multiple dimming subranges, the control circuit 14 performs the amplitude control of controlling the current value of the current supplied to the light source device 30 while performing the PWM control at the constant duty cycle.

Thereby, the control circuit 14 operates the light source device 30 at the dimming level designated by the dimming signal for example.

As apparent from the above, the control circuit 14 is configured to perform the dimming control of the lighting circuit 10 according to the desired dimming level to thereby dim the light source device 30. The dimming control includes the amplitude control and the PWM control. The amplitude control is control of adjusting the current value of the current supplied from the lighting circuit 10 to the light source device 30, to a desired current value. The PWM control is control of adjusting the duty cycle to a desired duty cycle. The duty cycle is defined as a ratio of the on-period to the cycle. The cycle is the sum of the on-period and the off-period. The on-period is a period in which the current flows through the light source device 30, and the off-period is a period in which the current does not flow through the light source device 30. The total dimming range (D0) of the light source device (30; 30A; 30B) includes multiple different dimming subranges (D1, D2, D3, D4) which are different ranges of dimming levels and associated with different predetermined values each of which is defined as the duty cycle which allows luminance of the light source device (30; 30A; 30B) to be equal to preliminarily determined upper limit luminance of an associated one of the multiple different dimming subranges (D1, D2, D3, D4) under a condition where the current value of the current is a maximum value. The control circuit 14 is configured to, in the dimming control, set the desired current value to a value corresponding to the desired dimming level, and further set the desired duty cycle to one of the different predetermined values associated with one of the multiple dimming subranges (D1, D2, D3, D4) which contains the desired dimming level.

Figure 2:
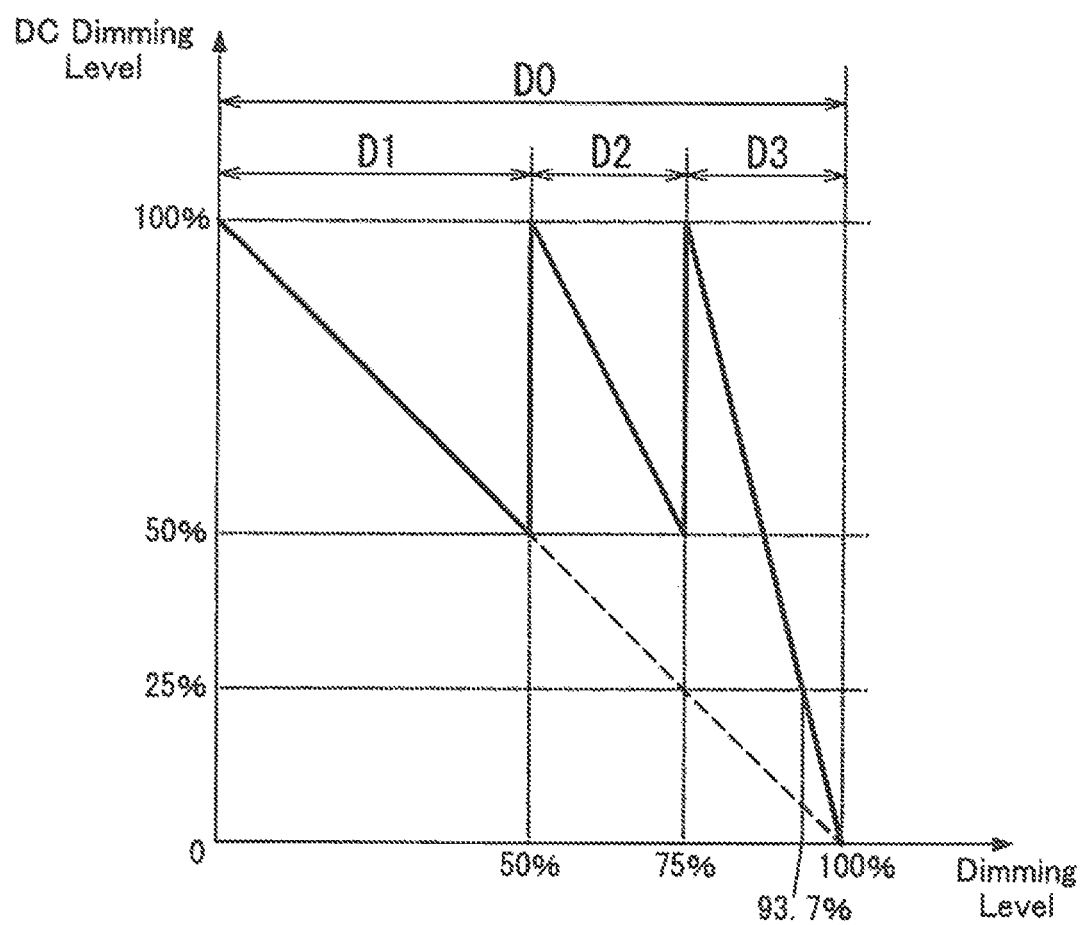
FIG. 2 relates to a dimming operation of the lighting device of Embodiment 1, and is a graph illustrating a relationship between a dimming level and a DC dimming level.

FIG. 2 is a diagram for illustrating a relationship between the dimming level and a DC dimming level in a particular case. In the particular case, the total dimming range D0 is a range of dimming levels from 0% (a full power lighting state) to 100% (an extinction state), and is divided into three dimming subranges D1, D2, and D3, and in each of the dimming subranges D1, D2, and D3, the amplitude control and the PWM control are performed. The DC dimming level (%) is equal to a value proportional to the current value of the current flowing through the light source device 30. The DC dimming level is 100% when the current value is a maximum value, and is 0% when the current value is zero.

It is known that a light source for emitting white light by use of blue LEDs and yellow phosphors shows that a color of emitted light becomes more yellowish as a current flowing through the light source is decreased. In an example of control shown in FIG. 2, an LED is supposed to show a change in a color when the current value of the current flowing through the light source device 30 is lower than a current value corresponding to the DC dimming level of 25%. In consideration of individual differences of light emitting diodes and circuit components, a threshold value of the current value for changing the duty cycle is set to 50%.

In short, when the current value is decreased to a current value corresponding to the DC dimming level of 50% by the amplitude control in each of the dimming subranges D1 and D2, the control circuit 14 performs control of changing the duty cycle. Further, the control circuit 14 sets the frequency of the PWM control to a frequency (e.g., 1 kHz) sufficiently higher than a frequency (e.g., about 100 Hz) which allows persons to visually perceive flicker. Note that, a change in the current flowing through the light source groups 31, 32, and 33 may occur when the control circuit 14 switches the dimming subrange. An integral of the output current during time (e.g., about 10 ms) enough to allow persons to visually perceive flicker before switch of the dimming subrange is almost equal to that after the switch of the dimming subrange. Therefore, persons cannot perceive such a change as flicker.

In this regard, the duty cycle in the dimming subrange D1 is equal to a duty cycle (100%) which allows the luminance of the light source device 30 to be equal to the upper limit luminance (the dimming level of 0%) of the dimming subrange D1 when the current value is a maximum value (a current value corresponding to the DC dimming level of 100%). Therefore, in the dimming subrange D1, the control circuit 14 adjusts the current value while keeping the duty cycle equal to 100%, thereby dimming the light source device 30. When the control circuit 14 increases the dimming level to 50% in the dimming subrange D1, the current value is decreased to 50% of the maximum value. Therefore, to further increase the dimming level from 50%, the control circuit 14 switches the duty cycle. Note that, the dimming level of the light source device 30 is given as a value obtained by subtracting, from 100%, a multiple of the DC dimming level (%) (expressed in percent of a maximum value of the current value) of the amplitude control and the duty cycle (%)).

The duty cycle in the dimming subrange D2 is equal to a duty cycle (50%) which allows the luminance of the light source device 30 to be equal to the upper limit luminance (the dimming level of 50%) of the dimming subrange D2 when the current value of the current is the maximum value (the current value corresponding to the DC dimming level of 100%). Therefore, in the dimming subrange D2, the control circuit 14 adjusts the current value while keeping the duty cycle equal to 50%, thereby dimming the light source device 30. When the control circuit 14 increases the dimming level to 75% in the dimming subrange D2, the current value is decreased to 50% of the maximum value. Therefore, to further increase the dimming level from 75%, the control circuit 14 switches the duty cycle.

The duty cycle in the dimming subrange D3 is equal to a duty cycle (25%) which allows the luminance of the light source device 30 to be equal to the upper limit luminance (the dimming level of 75%) of the dimming subrange D3 when the current value of the current is the maximum value (the current value corresponding to the DC dimming level of 100%). Therefore, in the dimming subrange D3, the control circuit 14 adjusts the current value while keeping the duty cycle equal to 25%, thereby dimming the light source device 30. When the control circuit 14 increases the dimming level to 93.7% in the dimming subrange D3, the current value is decreased to 25% of the maximum value.

In a case where dimming of the light source device 30 is done by only the amplitude control of controlling the current flowing through the light source device 30, the DC dimming level reaches 25% when the dimming level is set to 75%. In contrast, in the present embodiment, the duty cycle is changed twice, and therefore the dimming level of the output current when the DC dimming level is 25% is increased to 93.7%. Therefore, the lighting device 1 of the present embodiment can perform the dimming control at the dimming level corresponding to lower luminance, and nevertheless suppress the color of emitted light from becoming yellowish.

Further, the lighting device 1 of the present embodiment performs a combination of the PWM control and the amplitude control, thereby performing the dimming control. Hence, in contrast to a case where dimming is done by the PWM control only, the duty cycle can be kept large, and therefore the dimming control can be performed at the dimming level corresponding to lower luminance. Thus, controllability of the dimming control can be improved. For example, in a case where dimming is done by the PWM control only, the on-period allowing the dimming level to be equal to 93.7% has a length of 63 μs when the frequency of the PWM control is 1 kHz. In contrast, in the present embodiment, the duty cycle is 25%, and the on-period has a length of 250 μs in the dimming subrange D3. Therefore, the length of the on-period in the present embodiment is about four times larger than in the case where dimming is done by the PWM control only. Thus, controllability of the dimming control can be improved.

Note that, in the example shown in FIG. 2, the control circuit 14 sets the three dimming subranges D1, D2, and D3 divided from the total dimming range D0. However, the number of dimming subranges is not limited to three. The total dimming range may be divided into two dimming subranges, or the total dimming range may be divided into four or more dimming subranges. An increase in the number of dimming subranges may lead to an increase in a lower limit value of the amplitude of the current flowing through the light source device 30, but may lead to presence dimming subranges with lower duty cycles. Therefore, in consideration of the lower limit value of the amplitude of the current and the duty cycle, the number of dimming subranges and ranges of dimming levels of dimming subranges can be set appropriately.

The lighting device 1 of the present embodiment includes the lighting circuit 10 configured to supply a current to the light source device 30, and the control circuit 14 configured to dim the light source device 30. The control circuit 14 is configured to dim the light source device 30 by performing the amplitude control of the current value of the current which the lighting circuit 10 supplies to the light source device 30, and the PWM control of the duty cycle defined as a ratio of the on-period to the sum of the on-period and the off-period, the on-period being a period in which the current flows through the light source device 30, and the off-period being a period in which the current does not flow through the light source device 30. The control circuit 14 is configured to, in each of the multiple dimming subranges divided from the total dimming range of the light source device 30, perform the PWM control at the duty cycle allowing the luminance of the light source to be equal to upper limit luminance of the corresponding dimming subrange when the current value of the current is the maximum value, and perform the amplitude control of the current value of the current.

Accordingly, in contrast to a case where dimming is done by the amplitude control only, the current value of the current flowing through the light source device 30 can be kept large, and therefore it is possible to prevent the color of light emitted from the light source device 30 from becoming yellowish. Thus, a change in the color of emitted light can be suppressed. Further, in contrast to a case where dimming is done by the PWM control only, the duty cycle can be kept large, and therefore effects of the slew rate can be decreased. Therefore, controllability of the dimming control can be improved.

In the present embodiment, the control circuit 14 may be configured to perform the amplitude control in a range of currents equal to or greater than a predetermined minimum value in each of the multiple dimming subranges.

Accordingly, in the amplitude control, the current value of the current flowing through the light source device 30 can be kept in the range of currents equal to or larger than the minimum value. For example, in a case of the light source device 30 being a light emitting diode, the minimum value can be set to a current value higher than a current value allowing the color of emitted light to be yellowish. Consequently, it is possible to suppress a change in the color of emitted light of the light emitting diode.

2. Embodiment 2

Figure 3:
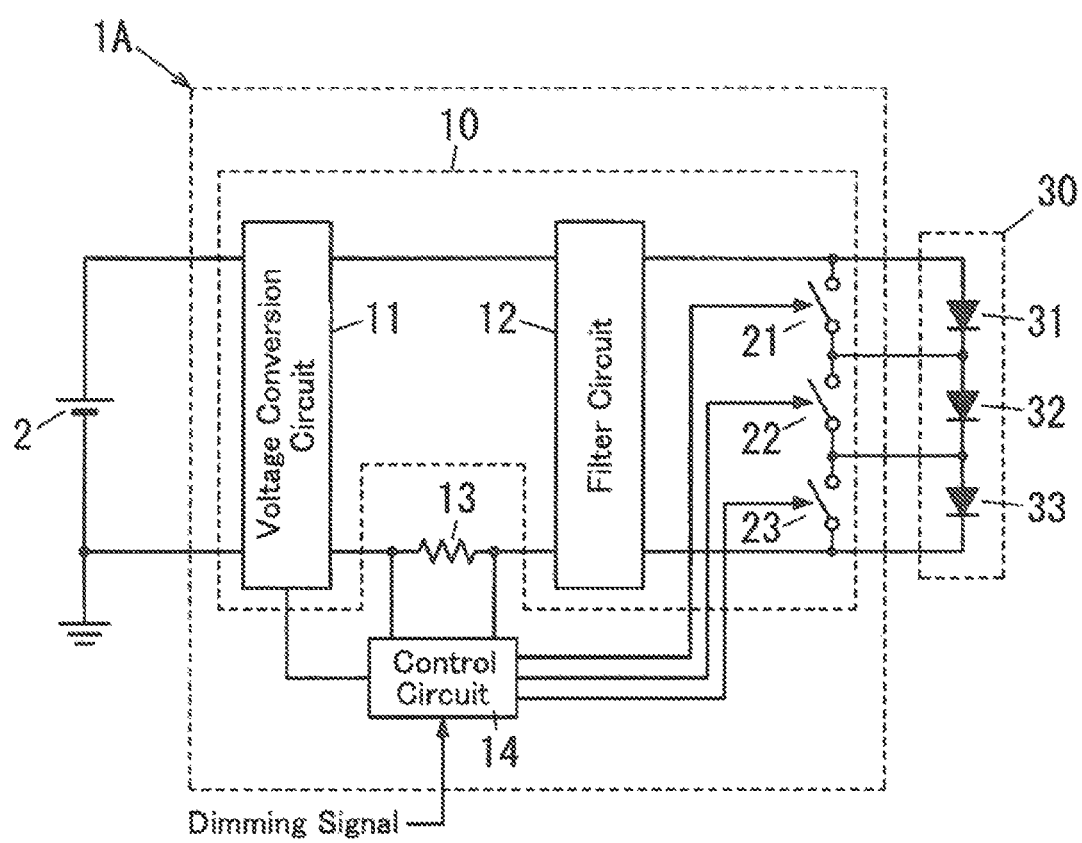
FIG. 3 is circuit diagram of a lighting device of Embodiment 2.

FIG. 3 is a circuit diagram of a lighting device 1A of the present embodiment. Note that, components common to the lighting device 1A of the present embodiment and the lighting device 1 of Embodiment 1 are designated by common reference signs to omit redundant explanations thereof.

The lighting device 1 of Embodiment 1 turns on and off the three light source groups 31, 32, and 33, collectively. However, the present embodiment turns on and off the three light source groups 31, 32, and 33, individually.

The light source device 30 includes the three light source groups 31, 32, and 33, and the three light source groups 31, 32, and 33 are connected in series between the output terminals of the filter circuit 12. The light source groups 31, 32, and 33 each include the same number of multiple light emitting diodes connected in series, for example. The light source groups 31, 32, and 33 each may include the same number of multiple light emitting diodes connected in parallel. Note that, each of the light source groups 31, 32, and 33 is not limited to including multiple light emitting diodes. Each of the light source groups 31, 32, and 33 may include a single light emitting diode.

There are switches 21, 22, and 23 respectively connected in parallel with the light source groups 31, 32, and 33.

The switches 21, 22, and 23 each may be a semiconductor switch such as a metal oxide semiconductor field effect transistor (MOSFET), for example. The switches 21, 22, and 23 are to be turned on and off according to control signals (second control signals) inputted from the control circuit 14 to control electrodes of the switches 21, 22, and 23, respectively. Note that, the switches 21, 22, and 23 each are not limited to a MOSFET, but may be a bipolar transistor such as an IGBT.

The control circuit 14 performs control being a combination of the amplitude control and the PWM control, thereby dimming the light source groups 31, 32, and 33.

The control circuit 14 is configured to measure the voltage across the resistor 13 connected in series with the light source groups 31, 32, and 33, and determine the current value of the current flowing through the light source groups 31, 32, and 33, based on the voltage across the resistor 13. The control circuit 14 is configured to output the control signal (first control signal) to the voltage conversion circuit 11 based on the result of measurement of the current value of the current flowing through the light source group 31, 32, and 33 in order to cause the voltage conversion circuit 11 to perform switching operation, thereby changing the output voltage of the voltage conversion circuit 11. In summary, the control circuit 14 adjusts the output voltage of the voltage conversion circuit 11 to thereby control the current value of the current supplied from the lighting circuit 10 to the light source group 31, 32, and 33 (the amplitude control).

The control circuit 14 outputs control signals (second control signals) to the switches 21, 22, and 23 in order to turn on and off the switches 21, 22, and 23, respectively. The control circuit 14 performs the PWM control of the duty cycle. The duty cycle is a ratio of the on-period Ton to the cycle T1 defined by the sum of the on-period Ton and the off-period Toff (see FIG. 5 and FIG. 6). The on-period Ton is a period in which the current flows through a corresponding one of the light source groups 31, 32, and 33, and the off-period Toff is a period in which the current flows through a corresponding one of the light source groups 31, 32, and 33.

Particularly, in the present embodiment, the multiple dimming subranges D1, D2, and D3 have the same width within the total dimming range (D0), and the number of multiple dimming subranges D1, D2, and D3 is equal to the number of multiple light source groups 31, 32, and 33. The control circuit 14 is configured to, in the PWM control, supply the current to the multiple light source groups 31, 32, and 33 in sequence at a time interval. The time interval is equal to a value obtained by dividing the cycle T1 of the PWM control by the number of multiple light source groups 31, 32, and 33.

The control circuit 14 performs dimming control described later with regard to each of the three dimming subranges D1, D2, and D3 obtained by regularly dividing the total dimming range D0 common to the light source group 31, 32, and 33 by the number (three in the present embodiment) of multiple light source groups 31, 32, and 33.

With regard to each of the multiple dimming subranges D1, D2, and D3, the control circuit 14 performs the PWM control at the duty cycle which allows luminance of each the light source groups 31, 32, and 33 to be equal to upper limit luminance of the dimming subrange while the current value is the maximum value. This means that in each of the multiple dimming subranges D1, D2, and D3, the duty cycle of the PWM control is constant. Further, with regard to each of the multiple dimming subranges D1, D2, and D3, the control circuit 14 performs the amplitude control of the current value of the current supplied to the light source groups 31, 32, and 33 while performing the PWM control at the constant duty cycle, thereby dimming the light source groups 31, 32, and 33. Note that, the control circuit 14 performs the amplitude control and the PWM control according to the dimming signal to be inputted from an external circuit, for example. Thereby, the control circuit 14 operates the light source group 31, 32, and 33 at the dimming level designated by the dimming signal.

Figure 4:
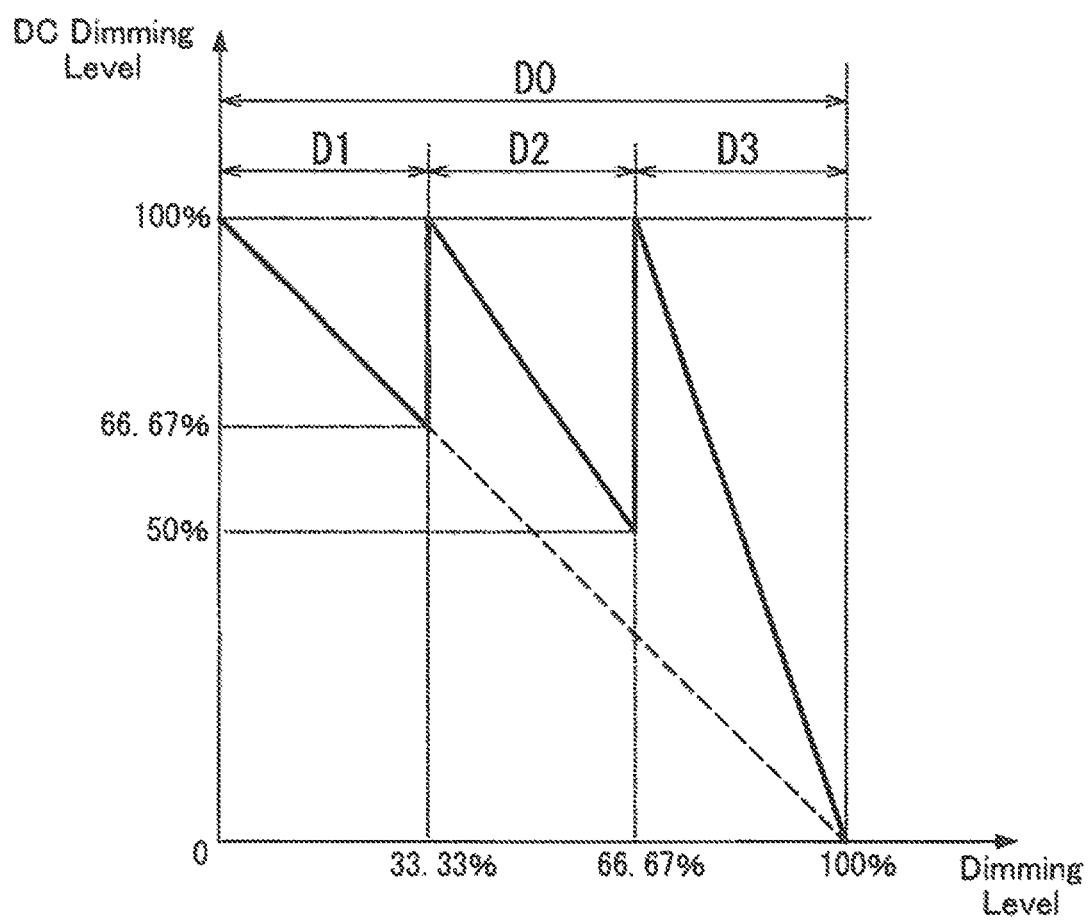
FIG. 4 relates to a dimming operation of the lighting device of Embodiment 2, and is a graph illustrating a relationship between a dimming level and a DC dimming level.

FIG. 4 is a graph illustrating a relationship between the dimming level and the amplitude of the current in a case where the amplitude control and the PWM control are performed in terms of the current in each of the dimming subranges D1, D2, and D3.

In the present embodiment, the total dimming range D0 is equally divided into three subranges. Therefore, the dimming subrange D1 is a dimming range of dimming levels from 0% to 33.33%, and the dimming subrange D2 is a dimming range of dimming levels from 33.33% to 66.67%, and the dimming subrange D3 is a dimming range of dimming levels from 66.67% to 100%.

When the control circuit 14 decreases luminance of the light source groups 31, 32, and 33 from the full power lighting state, the control circuit 14 performs the amplitude control on the current while the duty cycle is kept equal to 100% in the dimming subrange D1.

To further increase the dimming level from 33.33% (decrease the luminance), the control circuit 14 switches the duty cycle. The control circuit 14 sets the duty cycle in the dimming subrange D2 to a duty cycle (66.67%) which allows the luminance of the light source device 30 to be equal to the upper limit luminance (the dimming level of 33.33%) of the dimming subrange D2 when the current value of the current is the maximum value. Therefore, in the dimming subrange D2, the control circuit 14 performs the amplitude control on the current while keeping the duty cycle equal to 66.67%, thereby dimming the light source group 31, 32, and 33.

Figure 5:
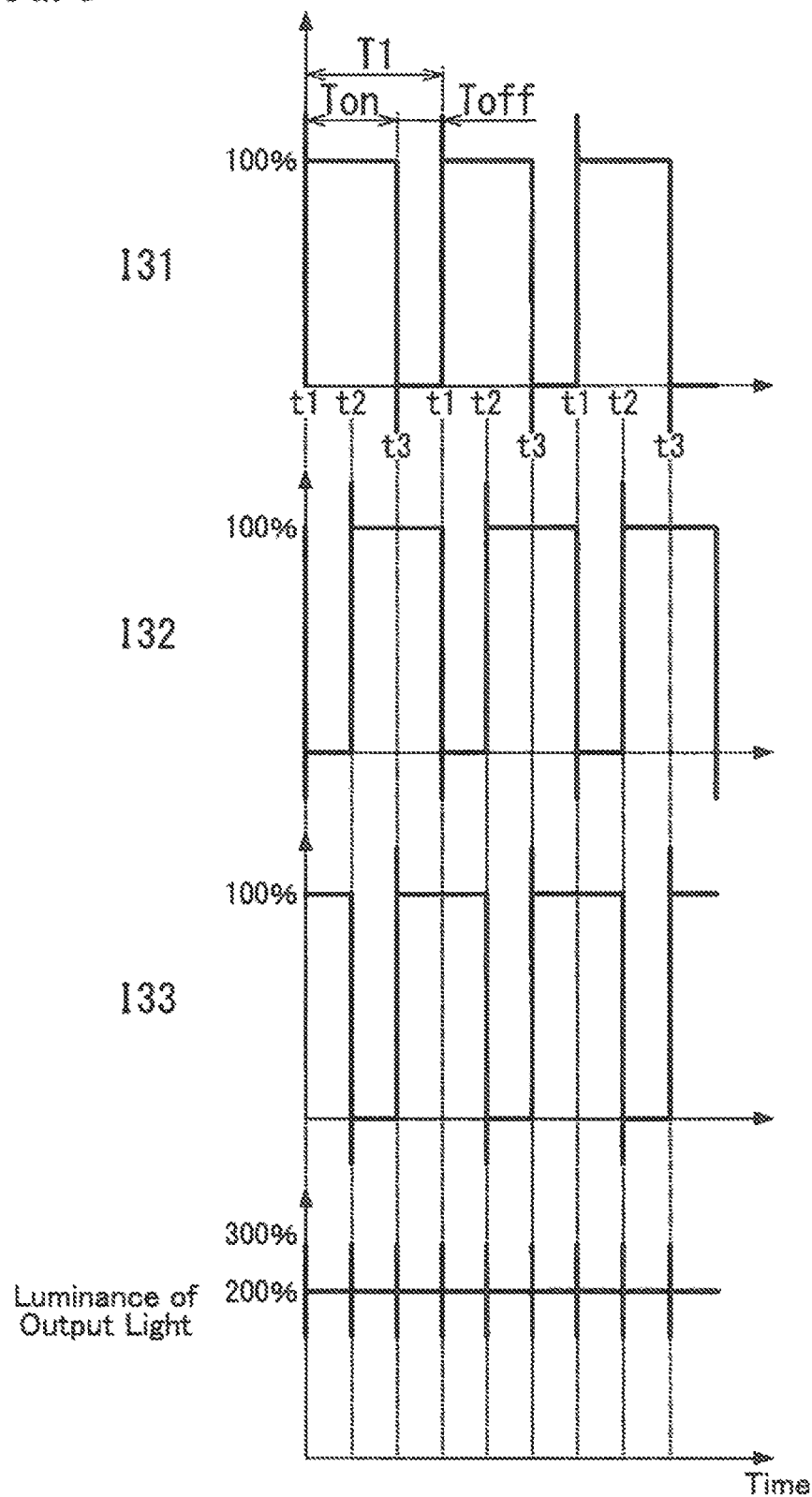
FIG. 5 is a diagram illustrating an example of a time variation of currents flowing through individual light source groups and an intensity of output light in terms of the lighting device of Embodiment 2.

FIG. 5 is a graph illustrating a relationship between the luminance of the output light and currents I31, I32, and I33 respectively flowing through the light source groups 31, 32, and 33, in a case where the dimming level is set to 33.33% in the dimming subrange D2.

The control circuit 14 sets timings of turning on the light source group 31, 32, and 33 so that a difference between a preceding timing and a subsequent timing is equal to time (T1/3) obtained by dividing one cycle T1 of the PWM control by the number of light source groups 31, 32, and 33. In the example shown in FIG. 5, the control circuit 14 turns on the light source groups 31, 32, and 33 in sequence of the light source groups 31, 32, and 33. Hereinafter, a timing at which the light source group 31 starts to emit light is defined as a timing t1, and a timing after a lapse of time (T1/3) from the timing t1 is defined as a timing t2, and a timing after a lapse of time (T1/3) from the timing t2 is defined as a timing t3.

At the timing t1, the light source group 31 starts to emit light, and the light source group 32 is turned off, and the light source group 33 continues to emit light. During a period between the timing t1 and the timing t2, the light source groups 31 and 33 emit light, and the light source group 32 is off. At the timing t2, the light source group 31 continues to emit light, and the light source group 32 starts to emit light, and the light source group 33 is turned off. During a period between the timing t2 and the timing t3, the light source groups 31 and 32 emit light, and the light source group 33 is off. At the timing t3, the light source group 31 is turned off, and the light source group 32 continues to emit light, and the light source group 33 starts to emit light. During a period between the timing t3 and the timing t1 of the subsequent cycle, the light source groups 32 and 33 emit light, and the light source group 31 is off.

In summary, in the dimming subrange D2, the duty cycle is set to 66.67% and the timings at which the light source groups 31, 32, and 33 start to emit light are made to come sequentially at an interval of the time (T1/3). Therefore, two of the three light source groups 31, 32, and 33 are always on. Therefore, when the luminance in the case where all the light source groups 31, 32, and 33 emit light simultaneously is supposed to be 300%, the luminance in the dimming subrange D2 is 200%, and therefore a temporal change in the luminance can be reduced.

Further, the control circuit 14 always turns on two of the three light source groups 31, 32, and 33 while performing interleaving operation of turning on the light source group 31, 32, and 33 at mutually different timings. Therefore, it is possible to reduce amounts of overshoot and undershoot and a noise level.

To further increase the dimming level from 66.67%, the control circuit 14 switches the duty cycle. Note that, in the dimming subrange D2, the DC dimming level corresponding to the dimming level of 66.67% is 50%.

The control circuit 14 sets the duty cycle in the dimming subrange D3 to a duty cycle (33.33%) which allows the luminance of the light source device 30 to be equal to the upper limit luminance (the dimming level of 66.67%) of the dimming subrange D3 when the current value of the current is the maximum value. Therefore, in the dimming subrange D3, the control circuit 14 performs the amplitude control on the current while keeping the duty cycle equal to 33.33%, thereby dimming the light source group 31, 32, and 33.

Figure 6:
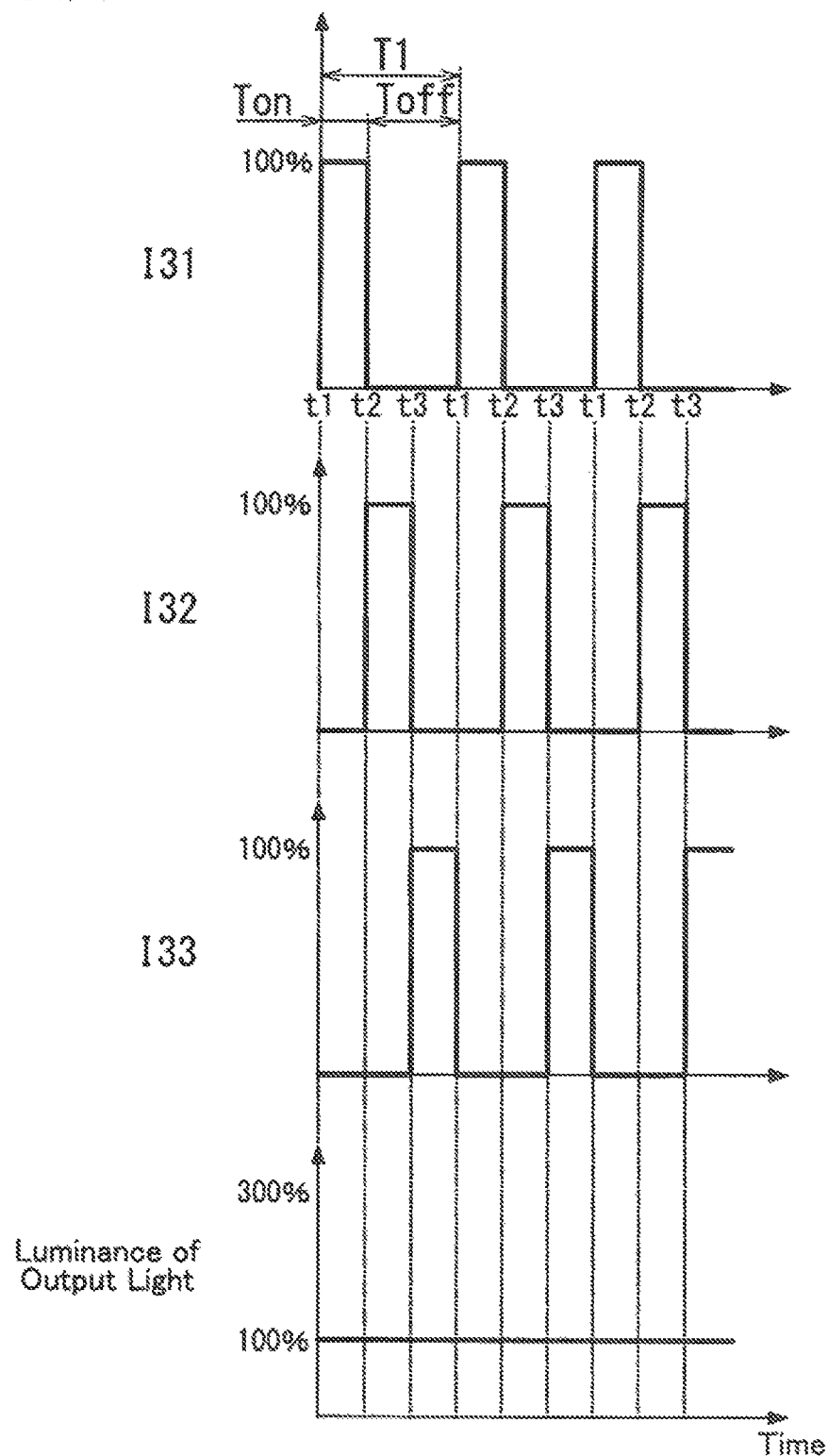
FIG. 6 is a diagram illustrating another example of a time variation of currents flowing through individual light source groups and an intensity of output light in terms of the lighting device of Embodiment 2.

FIG. 6 is a graph illustrating a relationship between the luminance of the output light and the currents 131, 132, and 133 respectively flowing through the light source groups 31, 32, and 33, in a case where the dimming level is set to 66.67% in the dimming subrange D3. Note that, the timings at which the control circuit 14 turns on the light source groups 31, 32, and 33 are the same as those in the operational example shown in FIG. 5.

At the timing t1, the light source group 31 starts to emit light, and the light source group 32 is turned off, and the light source group 33 continues the extinction state. During the period between the timing t1 and the timing t2, the light source groups 31 emits light, and the light source groups 32 and 33 are off. At the timing t2, the light source group 31 is turned off, and the light source group 32 starts to emit light, and the light source group 33 continues the extinction state. During the period between the timing t2 and the timing t3, the light source groups 32 emits light, and the light source groups 31 and 33 are off. At the timing t3, the light source group 31 continues the extinction state, and the light source group 32 is turned off, and the light source group 33 starts to emit light. During the period between the timing t3 and the timing t1 of the subsequent cycle, the light source groups 33 emits light, and the light source groups 31 and 32 are off.

In summary, in the dimming subrange D3, the duty cycle is set to 33.33% and the timings at which the light source groups 31, 32, and 33 start to emit light are made to come sequentially at an interval of the time (T1/3). Therefore, only one of the three light source groups 31, 32, and 33 is always on. Therefore, when the luminance in the case where all the light source groups 31, 32, and 33 emit light simultaneously is supposed to be 300%, the luminance in the dimming subrange D3 is 100%, and therefore a temporal change in the luminance can be reduced.

Figure 7:
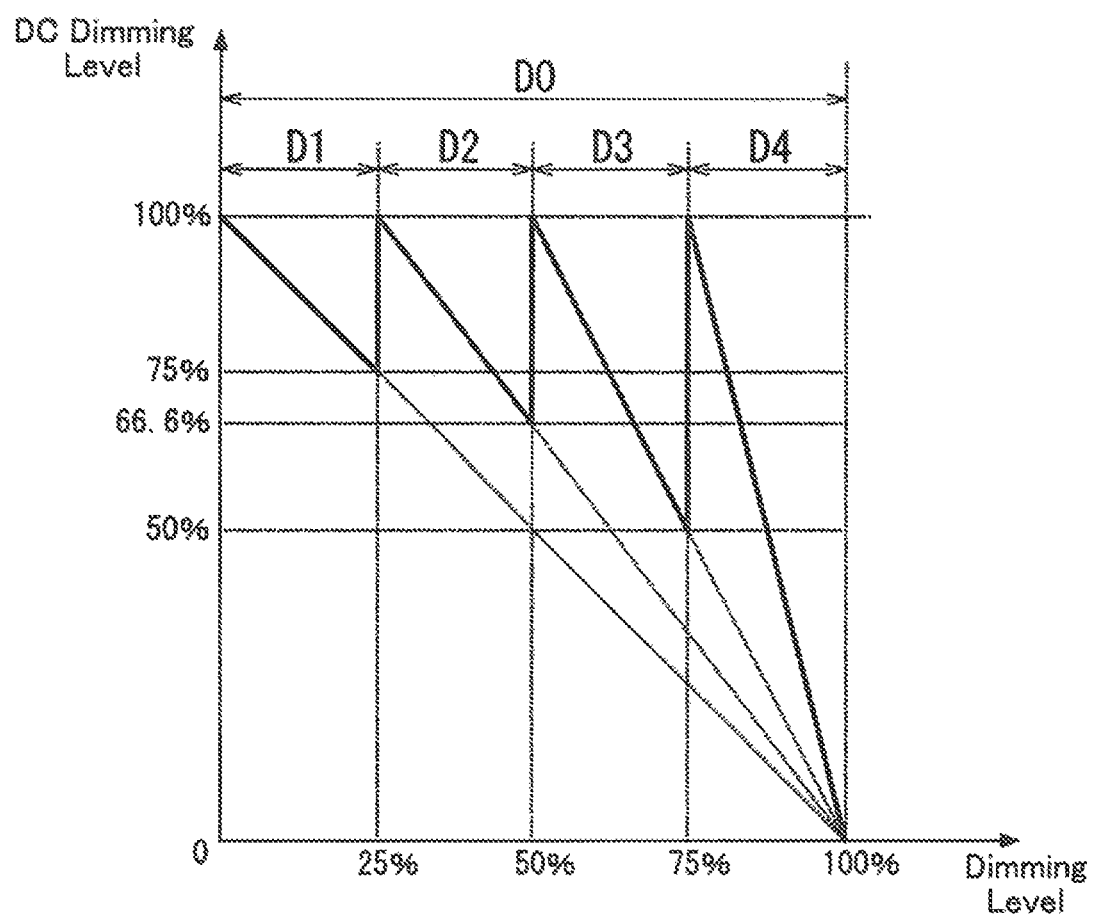
FIG. 7 relates to another dimming operation of the lighting device of Embodiment 2, and is a graph illustrating a relationship between a dimming level and a DC dimming level.

Note that, the above description of the present embodiment relates to a case including the three light source groups 31, 32, and 33. However, the number of light emitting groups is not limited to three. The dimming operation in a case in which the number of light emitting groups is four is described below with reference to FIG. 7.

When the number of light source groups is four, the control circuit 14 equally divides the total dimming range D0 into four dimming subranges D1 to D4. The dimming subrange D1 is a dimming range of dimming levels from 0% to 25%, and the dimming subrange D2 is a dimming range of dimming levels from 25% to 50%, and the dimming subrange D3 is a dimming range of dimming levels from 50% to 75%, and the dimming subrange D4 is a dimming range of dimming levels from 75% to 100%.

When the control circuit 14 decreases luminance of the four light source groups from the full power lighting state, the control circuit 14 performs the amplitude control on the current while the duty cycle is kept equal to 100% in the dimming subrange D1.

To further increase the dimming level from 25%, the control circuit 14 switches the duty cycle. The control circuit 14 sets the duty cycle in the dimming subrange D2 to a duty cycle (75%) which allows the luminance of the light source device 30 to be equal to the upper limit luminance (the dimming level of 25%) of the dimming subrange D2 when the current value of the current is the maximum value. Therefore, in the dimming subrange D2, the control circuit 14 performs the amplitude control on the current while keeping the duty cycle equal to 75%, thereby dimming the four light source groups.

To further increase the dimming level from 50%, the control circuit 14 switches the duty cycle. Note that, in the dimming subrange D2, the DC dimming level corresponding to the dimming level of 50% is 66.6%.

The control circuit 14 sets the duty cycle in the dimming subrange D3 to a duty cycle (50%) which allows the luminance of the light source device 30 to be equal to the upper limit luminance (the dimming level of 50%) of the dimming subrange D3 when the current value of the current is the maximum value. Therefore, in the dimming subrange D3, the control circuit 14 performs the amplitude control on the current while keeping the duty cycle equal to 50%, thereby dimming the four light source groups.

To further increase the dimming level from 75%, the control circuit 14 switches the duty cycle. Note that, in the dimming subrange D3, the DC dimming level corresponding to the dimming level of 75% is 50%.

The control circuit 14 sets the duty cycle in the dimming subrange D4 to a duty cycle (25%) which allows the luminance of the light source device 30 to be equal to the upper limit luminance (the dimming level of 75%) of the dimming subrange D4 when the current value of the current is the maximum value. Therefore, in the dimming subrange D4, the control circuit 14 performs the amplitude control on the current while keeping the duty cycle equal to 25%, thereby dimming the four light source groups.

In this regard, the respective timings at which the control circuit 14 starts to turn on the light source groups are made to be different to each other so that a difference between a preceding one and a subsequent one of the timings is equal to time (T1/4) obtained by dividing one cycle of the PWM control by the number of light source groups. Therefore, a temporal change in the luminance can be reduced.

Note that, when the number of light source groups is "n" (n is an integer equal to or larger than 2), the control circuit 14 regularly divides the total dimming range D0 into n dimming subranges D1 to Dn. The control circuit 14 performs the amplitude control on the current while keeping the duty cycle for each dimming subrange constant, thereby dimming the light source groups.

In this regard, the duty cycle DT1 of the k (k=1, 2, . . . , n)-th dimming subrange Dk can be represented by the formula of DT1=((n−(k−1))/n)×100(%).

When the control circuit 14 sets respective timings of turning on the "n" light emitting groups so that a difference between a preceding one and a subsequent one of the timings is equal to time obtained by dividing one cycle T1 of the PWM control by "n". Thus, a temporal change in the luminance can be reduced.

In the lighting device 1A of the present embodiment, the lighting circuit 10 is configured to supply currents to the multiple light source groups (the light source groups 31, 32, and 33) included in the light source device 30. The control circuit 14 is configured to perform the amplitude control and the PWM control for each of the multiple light source groups, in each of the multiple dimming subranges obtained by regularly dividing the total dimming range by the number of light emitting groups. The control circuit 14 is configured to perform the PWM control so that timings at which currents start to flow through the multiple light source groups are different so that a difference between a preceding one and a subsequent one of the timings is equal to a time difference obtained by dividing one cycle of the PWM control by the number of light source groups.

Accordingly, the number of light emitting groups which emit light is kept constant irrespective of a lapse of time. Therefore, a temporal change in the luminance of output light can be reduced.

3. Embodiment 3

Figure 8:
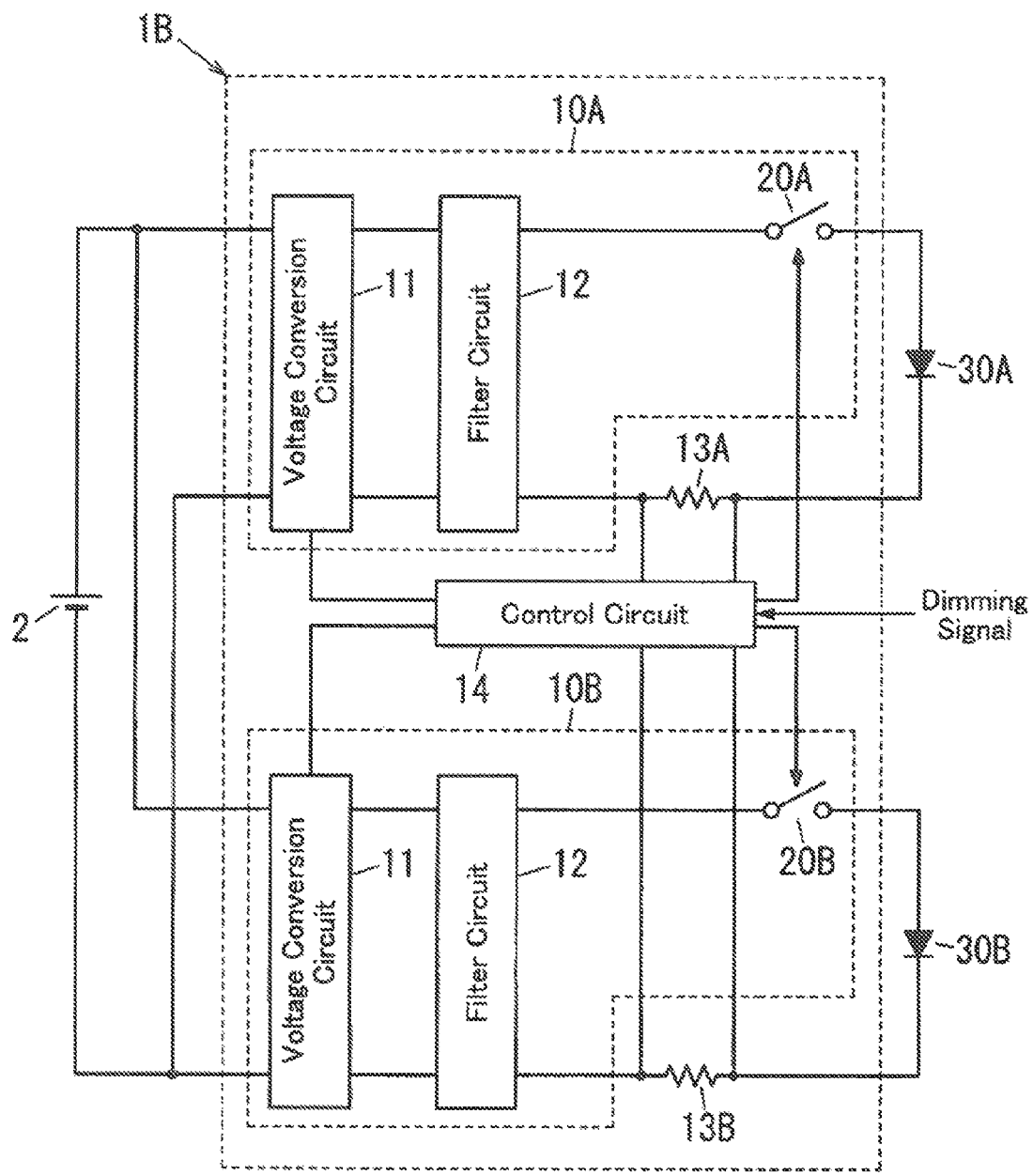
FIG. 8 is circuit diagram of a lighting device of Embodiment 3.

FIG. 8 is a circuit diagram of a lighting device 1B of the present embodiment.

The lighting device 1B of the present embodiment includes two lighting circuits 10A and 10B. The two lighting circuits 10A and 10B supply power to light source devices 30A and 30B, respectively. Each of the two lighting circuits 10A and 10B includes the voltage conversion circuit 11 and the filter circuit 12. Note that, components common to the lighting device 1B of the present embodiment and the lighting device 1 of Embodiment 1 are designated by common reference signs to omit redundant explanations thereof.

Further, in the lighting device 1B of the present embodiment, the single control circuit 14 controls operations of the two lighting circuits 10A and 10B. The control circuit 14 receives a voltage across a resistor 13A connected in series with the light source device 30A, and a voltage across a resistor 13B connected in series with the light source device 30B.

Figure 9:
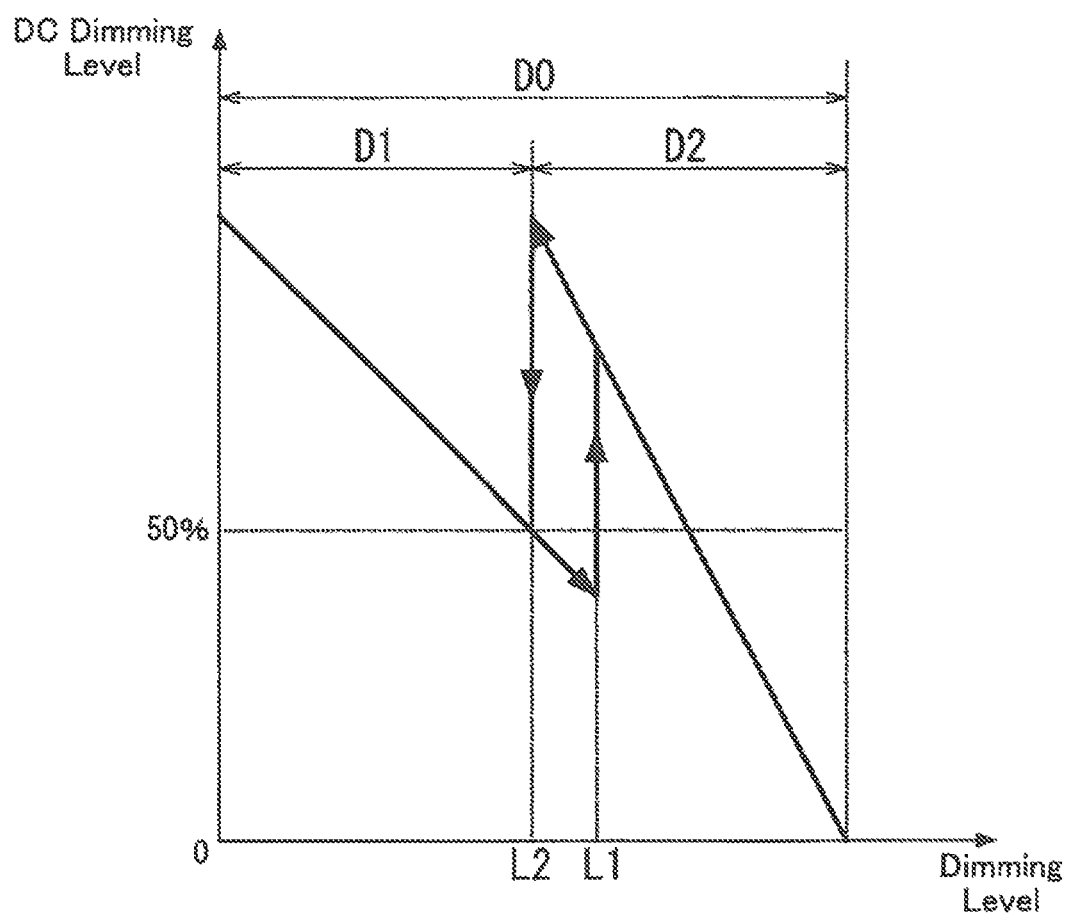
FIG. 9 relates to a dimming operation of the lighting device of Embodiment 3, and is a graph illustrating a relationship between a dimming level and a DC dimming level.

The control circuit 14 performs the dimming control defined as a combination of the PWM control and the amplitude control as with Embodiment 1. FIG. 9 is a graph illustrating the dimming operation of the lighting device 1B of the present embodiment. In the present embodiment, the total dimming range D0 is evenly divided into two dimming subranges D1 and D2. The dimming subrange D1 is defined as a dimming range of dimming levels from 0% to 50% (corresponding to L2 in FIG. 9), and the dimming subrange D2 is defined as a dimming range of dimming levels from 50% (L2) to 100%.

In each of the dimming subranges D1 and D2, the control circuit 14 performs the PWM control with the constant duty cycle and the amplitude control of the amplitude of the current, thereby dimming the light source devices 30A and 30B. The control circuit 14 sets the duty cycle in each of the dimming subranges D1 and D2 to a duty cycle which allows the luminance of the light source devices 30A and 30B to be equal to the upper limit luminance of the dimming subrange when the current value of the current is the maximum value. In more detail, the control circuit 14 sets the duty cycle in the dimming subrange D1 to a duty cycle (e.g., 100%) which allows the luminance of the light source devices 30A and 30B to be equal to the upper limit luminance (the dimming level of 0%) of the dimming subrange D1 when the current value of the current is the maximum value. Further, the control circuit 14 sets the duty cycle in the dimming subrange D2 to a duty cycle (e.g., 50%) which allows the luminance of the light source devices 30A and 30B to be equal to the upper limit luminance (the dimming level of 50%) of the dimming subrange D2 when the current value of the current is the maximum value.

In summary, in the dimming subrange D1, the control circuit 14 performs the PWM control with the duty cycle of 100% and the amplitude control of the amplitude of the current, thereby dimming the light source devices 30A and 30B. In the dimming subrange D2, the control circuit 14 performs the PWM control with the duty cycle of 50% and the amplitude control of the amplitude of the current, thereby dimming the light source devices 30A and 30B.

Further, in the present embodiment, the control circuit 14 is configured to set hysteresis to the dimming level defining a border between the dimming subranges D1 and D2. Setting the hysteresis means setting a first dimming level and a second dimming level so that luminance corresponding to the second dimming level is higher than luminance corresponding to the first dimming level. The first dimming level is used in a case of switching the current dimming subrange from the dimming subrange Dk (k is an integer equal to or larger than 1) to the dimming subrange D(k+1) corresponding to luminance lower than luminance corresponding to the dimming subrange Dk. The second dimming level is used in a case of switching the current dimming subrange from the dimming subrange D(k+1) to the dimming subrange Dk. In the present embodiment, the second dimming level (e.g., 50%) is set to correspond to luminance higher than luminance corresponding to the first dimming level (e.g., 60%). The first dimming level is used in a case of switching the current dimming subrange from the dimming subrange D1 to the dimming subrange D2 corresponding to luminance lower than luminance corresponding to the dimming subrange D1. The second dimming level is used in a case of switching the current dimming subrange from the dimming subrange D2 to the dimming subrange D1. Thus, it is possible to suppress frequent switching of the duty cycle of the PWM control and the DC dimming level of the amplitude control between values in the dimming subrange D1 and values in the dimming subrange D2 when the dimming level is around the border between the dimming subranges D1 and D2. Therefore, currents flowing through the light source devices 30A and 30B can be stabilized. Note that, how to set the hysteresis is not limited to the above instance. For example, when the dimming level defining the border between the dimming subranges D1 and D2 is 50%, the first dimming level L1 may be set to (50+x1)% and the second dimming level L2 may be set to (50−x2)%, wherein x1 and x2 can be set appropriately.

As understood from the above, setting the hysteresis to the dimming level defining the border between the dimming subranges means setting different first and second dimming levels in addition to the dimming level defining the border between first and second dimming subranges. The first dimming level is a dimming level for determining whether the current dimming subrange is switched from the first dimming subrange to the second dimming subrange, and is selected from dimming levels included in the second dimming subrange. The second dimming level is a dimming level for determining whether the current dimming subrange is switched from the second dimming subrange to the first dimming subrange, and is selected from dimming levels included in the first dimming subrange. Note that, one of the first dimming level and the second dimming level may be equal to the dimming level defining the border between the first and second dimming subranges.

As described above, the control circuit 14 may set the hysteresis to the dimming level defining the border between the multiple dimming subranges (at least one border between successive two of the multiple dimming subranges).

Accordingly, it is possible to suppress frequent switching of the duty cycle of the PWM control and the amplitude of the amplitude control when the dimming level is around the border between the dimming subranges, and thus control can be stabilized.

Note that, with regard to the lighting devices 1 and 1A of Embodiments 1 and 2, the control circuit 14 may set the hysteresis to the dimming level defining the border between the multiple dimming subranges. In this case, frequent switching of the duty cycle and the DC dimming level when the dimming level is around the border between the multiple dimming subranges can be suppressed.

4. Embodiment 4

Figure 10:
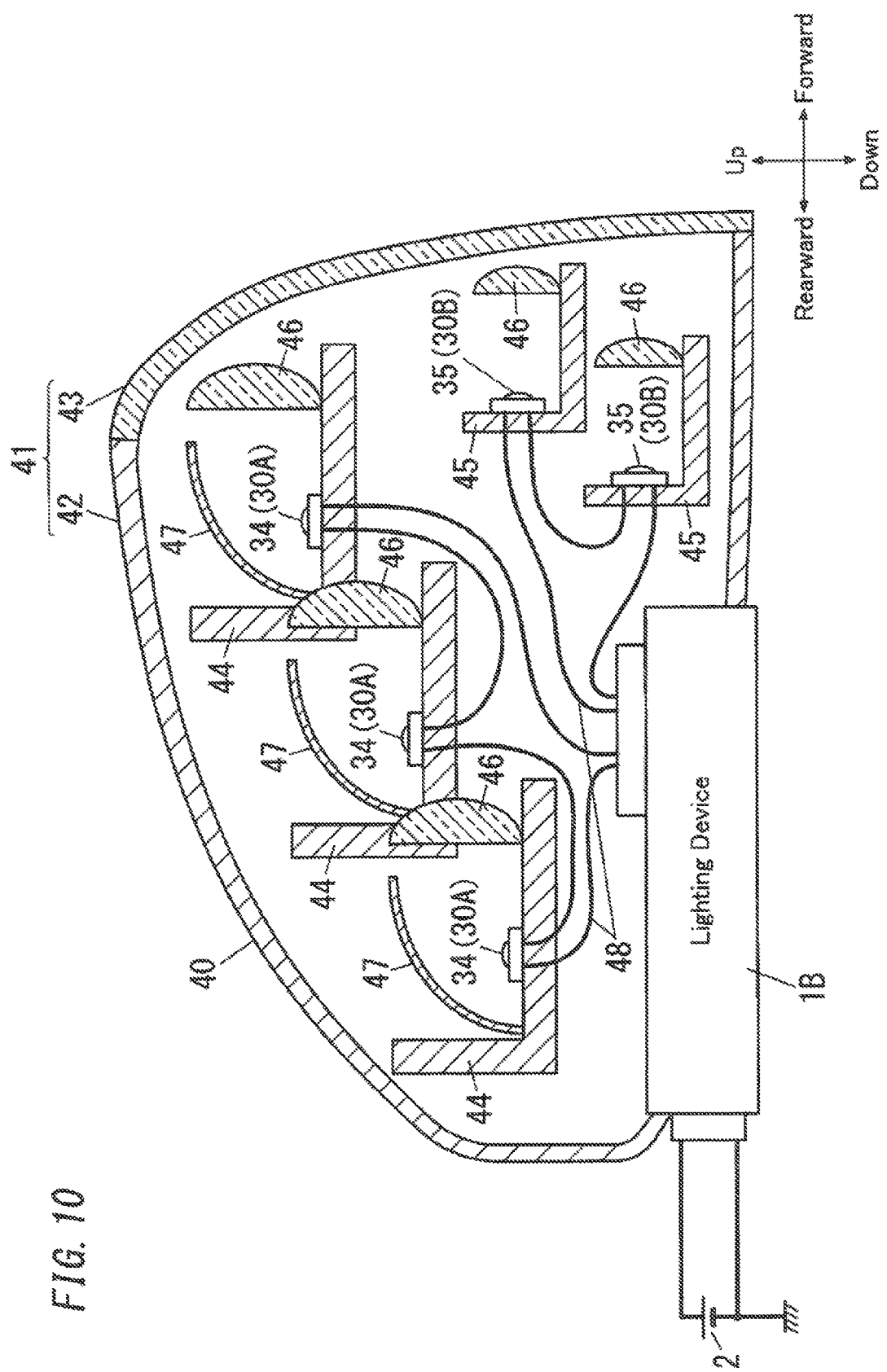
FIG. 10 is a section of a vehicle illumination device of Embodiment 4.

The following description referring to FIG. 10 is made to a vehicle illumination device 40 including the lighting device 1B of Embodiment 3. Note that, the description related to FIG. 10 is made based on the upward, downward, forward, and rearward directions designated by arrows shown in FIG. 10.

The vehicle illumination device 40 may be an illumination device for operating a headlight of a vehicle, for example.

This vehicle illumination device 40 includes a body 41. The body 41 includes a case 42 and a cover 43. The case 42 has a front face (a face directed in a forward direction of a vehicle when the case 42 is attached to the vehicle) with an opening. The cover 43 is light transmissive and is attached to the case 42 to cover the opening.

There are three light source groups 34 and two light source groups 35 accommodated in the body 41. The three light source groups 34 constitute the light source device 30A and the two light source groups 35 constitute the light source device 30B. The vehicle illumination device 40 of the present embodiment is a headlight device, and the light source device 30A is used as a main light (high beam), and the light source device 30B is used as a dipped light (low beam). Note that, each of the light source groups 34 and 35 may be constituted by multiple LEDs or a single LED.

There are three mounts 44 and two mounts 45 placed inside the body 41. The three light source groups 34 are attached to the three mounts 44 individually. The two light source groups 35 are attached to the two mounts 45 individually.

The multiple mounts 44 and 45 each are made of metal and have an L-shape in a side view. There are lens 46 for controlling distribution of light and a reflection plate 47 for reflecting light from the light source group 34 toward the lens 46 which are attached to the mount 44 to which the light source group 34 is attached. There is a lens 46 for controlling distribution of light which is attached to the mount 45 to which the light source group 35 is mounted.

The lighting device 1B is attached to a lower part of the case 42. The lighting device 1B is electrically connected to the light source groups 34 and 35 via cables 48.

Note that, the vehicle illumination device 40 is not limited to including the lighting device 1B of Embodiment 3, but may instead, or in addition, include at least one of the lighting devices 1 and 1A of Embodiments 1 and 2.

As described above, the vehicle illumination device 40 of the present embodiment includes the body 41 to be attached to the vehicle, and the lighting device 1B and the light source devices 30A and 30B (the light source groups 34 and 35) are held by the body 41. In other words, the vehicle illumination device 40 includes: the light source devices 30A and 30B; the lighting device 1B for controlling the light source devices 30A and 30B; and the body 41 which is to be attached to the vehicle 50 and is for holding the light source devices 30A and 30B and the lighting device 1B.

The vehicle illumination device 40 of the present embodiment can include any of the lighting devices 1, 1A, and 1B of Embodiments 1 to 3, and therefore controllability of the dimming control can be improved.

Figure 11:
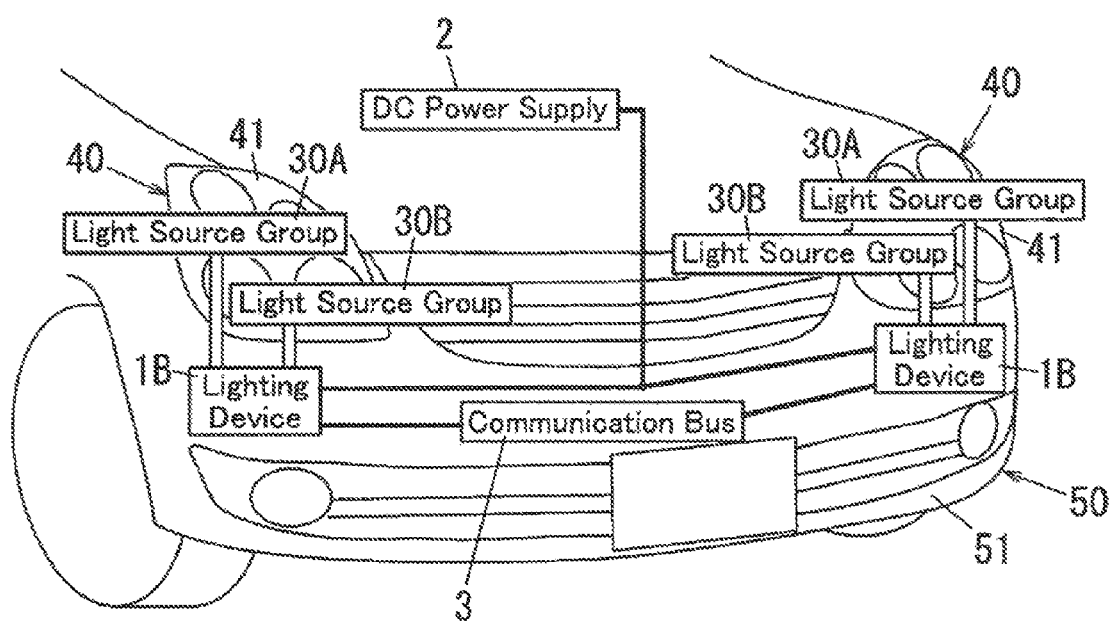
FIG. 11 is a perspective view of a front side of a vehicle of Embodiment 4.

FIG. 11 is a perspective view of a front side of a vehicle 50 including the vehicle illumination device 40 of the present embodiment.

The vehicle 50 of the present embodiment includes a pair of vehicle illumination devices 40 serving as headlights. The vehicle illumination devices 40 are mounted on left and right sides of the front side of a vehicle body 51 individually. The lighting devices 1B of the pair of vehicle illumination devices 40 each operates (at a full power state or a dimmed state) or turns off the light source devices 30A and 30B in response to manual operation of switches provided to a driver's compartment and/or surrounding luminance measured by a luminance sensor attached to the vehicle 50.

The lighting devices 1B of the vehicle illumination devices 40 on the left and right sides communicate with each other via a communication bus 3. Therefore, timings of turning on and off the light source devices 30A and 30B of one of the vehicle illumination devices 40 can be synchronized with timings of turning on and off the light source devices 30A and 30B of the other. The area of light distribution of the light source devices 30A and 30B of the left vehicle illumination device 40 partially overlaps the area of light distribution of the light source devices 30A and 30B of the right vehicle illumination device 40. The lighting devices 1B of the left and right vehicle illumination devices 40 controls the light source devices 30A and 30B so as to turn on the light source devices 30A and 30B of one of the vehicle illumination devices 40 when turning off the light source devices 30A and 30B of the other of the vehicle illumination devices 40. In this case, it is possible to reduce a temporal change in luminance in an overlap between the areas of light distribution.

As described above, the vehicle illumination device 40 of the present embodiment includes the pair of bodies 41 to be attached to the left and right sides of the vehicle 50 (the vehicle body 51). Each of the pair of bodies 41 holds any of the lighting devices 1, 1A, and 1B of Embodiments 1 to 3, and at least one light source device (exemplified by the light source devices 30, 30A, and 30B). In other words, the vehicle illumination device 40 includes: the pair of light source devices 30A and 30B; the pair of lighting devices 1B; and the pair of bodies 41. The pair of lighting devices 1B are for controlling the pair of light source devices 30A and 30B individually. The pair of bodies 41 are to be attached to the left and right sides of the vehicle 50. The pair of bodies 41 are for holding the pair of light source devices 30A and 30B and the pair of lighting devices 1B individually.

The vehicle illumination device 40 of the present embodiment can include any of the lighting devices 1, 1A, and 1B of Embodiments 1 to 3, and therefore controllability of the dimming control can be improved.

Further, the vehicle 50 of the present embodiment includes the vehicle illumination device 40 and the vehicle body 51 to which the vehicle illumination device 40 is attached.

The vehicle 50 of the present embodiment can include the vehicle illumination device 40 of the present embodiment, and therefore controllability of the dimming control can be improved.

5. Aspects

As apparent from the above embodiments, the lighting device (1; 1A; 1B) of the first aspect according to the present disclosure includes: a lighting circuit (10, 10A, 10B) configured to supply a current to a light source device (30; 30A; 30B); and a control circuit (14) configured to perform dimming control of the lighting circuit (10; 10A; 10B) according to a desired dimming level to thereby dim the light source device (30; 30A; 30B). The dimming control includes amplitude control and pulse width modulation control. The amplitude control is control of adjusting a current value of the current to a desired current value. The pulse width modulation control is control of adjusting a duty cycle to a desired duty cycle. The duty cycle is defined as a ratio of an on-period (Ton) to a cycle (T1) being a sum of the on-period (Ton) and an off-period (Toff). The on-period (Ton) is a period in which the current flows through the light source device (30; 30A; 30B). The off-period (Toff) is a period in which the current does not flow through the light source device (30; 30A; 30B). A total dimming range (D0) of the light source device (30; 30A; 30B) includes multiple different dimming subranges (D1, D2, D3, D4) which are different ranges of dimming levels and associated with different predetermined values each of which is defined as the duty cycle which allows luminance of the light source device (30; 30A; 30B) to be equal to preliminarily determined upper limit luminance of an associated one of the multiple different dimming subranges (D1, D2, D3, D4) under a condition where the current value of the current is a maximum value. The control circuit (14) is configured to, in the dimming control, set the desired current value to a value corresponding to the desired dimming level, and further set the desired duty cycle to one of the different predetermined values associated with one of the multiple dimming subranges (D1, D2, D3, D4) which contains the desired dimming level. According to the first aspect, controllability of the dimming control can be improved.

The lighting device (1; 1A; 1B) of the second aspect according to the present disclosure would be realized in combination with the first aspect. In the second aspect, the control circuit (14) is configured to perform the amplitude control in a range of currents equal to or greater than a predetermined minimum value in each of the multiple different dimming subranges (D1, D2, D3, D4). According to the second aspect, in the amplitude control, the current value of the current flowing through the light source device (30; 30A; 30B) can be kept in the range of currents equal to or larger than the minimum value.

The lighting device (1A) of the third aspect according to the present disclosure would be realized in combination with the first or second aspect. In the third aspect, the light source device (30) includes multiple light source groups (31, 32, 33). The multiple different dimming subranges (D1, D2, D3, D4) have a same width within the total dimming range (D0). A number of multiple different dimming subranges (D1, D2, D3, D4) is equal to a number of multiple light source groups (31, 32, 33). The control circuit (14) is configured to, in the pulse width modulation control, supply the current to the multiple light source groups (31, 32, 33) in sequence at a time interval. The time interval is equal to a value obtained by dividing the cycle (T1) of the pulse width modulation control by the number of multiple light source groups (31, 32, 33). According to the third aspect, the number of light emitting groups which emit light is kept constant irrespective of a lapse of time. Therefore, a temporal change in the luminance of output light can be reduced.

The lighting device (1; 1A; 1B) of the fourth aspect according to the present disclosure would be realized in combination with any one of the first to third aspects. In the fourth aspect, the control circuit (14) is configured to set hysteresis to a dimming level defining a border between the multiple different dimming subranges (D1, D2, D3, D4). According to the fourth aspect, it is possible to suppress frequent switching of the duty cycle of the pulse width modulation control and the amplitude of the amplitude control when the dimming level is around the border between the different dimming subranges (D1, D2, D3, D4), and thus control can be stabilized.

The vehicle illumination device (40) of the fifth aspect according to the present disclosure includes: a light source device (30A, 30B); the lighting device (1; 1A; 1B) of any one of the first to fourth aspects for controlling the light source device (30A, 30B); and a body (41) which is to be attached to a vehicle (50) and is for holding the light source device (30A, 30B) and the lighting device (1; 1A; 1B). According to the fifth aspect, controllability of the dimming control can be improved.

The vehicle illumination device (40) of the sixth aspect according to the present disclosure includes: a pair of light source devices (30A, 30B); a pair of lighting devices (1; 1A; 1B) of any one of the first to fourth aspects for controlling the pair of light source devices (30A, 30B) individually; and a pair of bodies (41) which are to be attached to a left and right sides of a vehicle (50) and are for holding the pair of light source devices (30A, 30B) and the pair of lighting devices (1; 1A; 1B) individually. According to the sixth aspect, controllability of the dimming control can be improved.

The vehicle (50) of the seventh aspect in accordance with the present disclosure includes: the vehicle illumination device (40) of the fifth or sixth aspect; and a vehicle body (51) to which the vehicle illumination device (40) is attached. According to the seventh aspect, controllability of the dimming control can be improved.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:
1. A lighting device comprising:
 a lighting circuit configured to supply a current to a light source device; and
 a control circuit configured to perform dimming control of the lighting circuit according to a desired dimming level to thereby dim the light source device,
 the dimming control including amplitude control and pulse width modulation control,
 the amplitude control being control of adjusting a current value of the current to a desired current value,
 the pulse width modulation control being control of adjusting a duty cycle to a desired duty cycle, the duty cycle being defined as a ratio of an on-period to a cycle being a sum of the on-period and an off-period, the on-period being a period in which the current flows through the light source device, the off-period being a period in which the current does not flow through the light source device,
 a total dimming range of the light source device including multiple different dimming subranges which are different ranges of dimming levels and associated with different predetermined values each of which is defined as the duty cycle which allows luminance of the light source device to be equal to preliminarily determined upper limit luminance of an associated one of the multiple different dimming subranges under a condition where the current value of the current is a maximum value, and, the control circuit being configured to, in the dimming control, set the desired current value to a value corresponding to the desired dimming level, and further set the desired duty cycle to one of the different predetermined values associated with one of the multiple dimming subranges which contains the desired dimming level.

2. The lighting device of claim 1, wherein the control circuit is configured to perform the amplitude control in a range of currents equal to or greater than a predetermined minimum value in each of the multiple different dimming subranges.

3. The lighting device of claim 1, wherein:

the light source device includes multiple light source groups, the multiple different dimming subranges have a same width within the total dimming range, a number of multiple different dimming subranges is equal to a number of multiple light source groups, the control circuit is configured to, in the pulse width modulation control, supply the current to the multiple light source groups in sequence at a time interval, and the time interval is equal to a value obtained by dividing the cycle of the pulse width modulation control by the number of multiple light source groups.

4. The lighting device of claim 1, wherein the control circuit is configured to set hysteresis to a dimming level defining a border between the multiple different dimming subranges.

5. A vehicle illumination device comprising:

a light source device;

the lighting device of claim 1 for controlling the light source device; and a body which is to be attached to a vehicle and is for holding the light source device and the lighting device.

6. A vehicle illumination device comprising:

a pair of light source devices;

a pair of lighting devices of claim 1 for controlling the pair of light source devices individually; and a pair of bodies which are to be attached to a left and right sides of a vehicle and are for holding the pair of light source devices and the pair of lighting devices individually.

7. A vehicle comprising:

the vehicle illumination device of claim 5; and a vehicle body to which the vehicle illumination device is attached.

* * * * *